United States Patent
Li

(10) Patent No.: US 10,877,804 B2
(45) Date of Patent: Dec. 29, 2020

(54) COMPUTING APPARATUS, ELECTRONIC DEVICE, AND INFORMATION PROCESSING METHOD

(71) Applicant: Lenovo (Beijing) Co., Ltd., Beijing (CN)

(72) Inventor: Dong Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 339 days.

(21) Appl. No.: 15/918,116

(22) Filed: Mar. 12, 2018

(65) Prior Publication Data

US 2018/0260250 A1 Sep. 13, 2018

(30) Foreign Application Priority Data

Mar. 10, 2017 (CN) .......................... 2017 1 0140806

(51) Int. Cl.
  *G06F 9/50* (2006.01)
(52) U.S. Cl.
  CPC .......... *G06F 9/5016* (2013.01); *G06F 9/5027* (2013.01)
(58) Field of Classification Search
  None
  See application file for complete search history.

(56) References Cited

U.S. PATENT DOCUMENTS

| | | | |
|---|---|---|---|
| 2014/0143507 A1* | 5/2014 | Maria Joseph | G06F 12/1491 711/147 |
| 2016/0070593 A1* | 3/2016 | Harris | G06F 11/3409 718/106 |

FOREIGN PATENT DOCUMENTS

| | | |
|---|---|---|
| CN | 103324539 A | 9/2013 |
| CN | 103713942 A | 4/2014 |
| CN | 106326457 A | 1/2017 |

OTHER PUBLICATIONS

Ramachandra, "Monitoring Apache Spark: Why is it Challenging?," Jun. 2016, Dzone, https://dzone.com/articles/monitoring-apache-spark-why-is-it-challenging, pp. 1-4 (Year: 2016).*

Haines, Diving into Apache Spark: Part 3, Jun. 2016, Turbonomic Blog, https://blog.turbonomic.com/blog/on-technology/diving-into-apache-spark-part-3, pp. 1-9 (Year: 2016).*

Zaharia et al., Resilient Distributed Datasets: A Fault Tolerant Abstraction for In-Memory Cluster Computing, Apr. 2012, NSDI'12: Proceedings of the 9th USENIX conference on Networked Systems Design and Implementation, pp. 1-14 (Year: 2012).*

(Continued)

*Primary Examiner* — Lewis A Bullock, Jr.
*Assistant Examiner* — Melissa A Headly
(74) *Attorney, Agent, or Firm* — Anova Law Group, PLLC

(57) ABSTRACT

A computing apparatus, an electronic device, and an information processing method are provided. The computing apparatus includes an executor, a driver, and a proxy component. The executor executes a computing operation based on a driving command to generate an execution result, the driver generates the driving command, and the proxy component is respectively connected to the executor and the driver. Further, the proxy component sends the driving command from the driver to the executor, and sends the execution result from the executor to the driver.

10 Claims, 3 Drawing Sheets

(56) References Cited

OTHER PUBLICATIONS

Charlotte77, "Learning Spark (Python version) Study notes (three)—working principle, tuning and Spark SQL", May 8, 2016, Retrieved from the Internet: URL: https://www.cnblogs.com/charlotte77/p/5468968.html, pp. 1-7 18 Pages (including translation).
Swaroop Ramachandra, "Monitoring Apache Spark: Why Is It Challenging?" Jun. 25, 2016, Retrieved from the Internet: URL: https://dzone.com/articles/monitoring-apache-spark-why-is-it-challenging, p. 4.
Breeze_LSW, "Spark troubleshooting and optimization", Aug. 22, 2016, Retrieved from the Internet: URL: https://www.jianshu.com/p/38e494ce14a1, pp. 1-13 23 Pages (including translation).
Blueskin, "Spark java.lang.OutOfMemory Error: Java heap space," Sep. 3, 2015, Retrieved from the Internet:URL: https://stackoverflow.com/questions/21138751/spark-java-lang-outofmemoryerror-java-heap-space, [retrieved on Mar. 13, 2020], p. 1-8.

* cited by examiner

COMPUTING APPARATUS, ELECTRONIC DEVICE, AND INFORMATION PROCESSING METHOD

CROSS-REFERENCES TO RELATED APPLICATIONS

This application claims priority to Chinese Patent Application No. 201710140806.4, filed on Mar. 10, 2017, the entire contents of which are hereby incorporated by reference.

TECHNICAL FIELD

The present disclosure generally relates to the field of electronic technology and, more particularly, to a computing apparatus, an electronic device, and an information processing method.

BACKGROUND

The Spark computing framework is a computing framework based on memory, which often includes an executor and a driver connected to the executor. The driver may drive the executor to operate. Further, the driver is mainly responsible for parsing a computing task, dividing the computing task into various computing stages, and allocating the computing task at various computing stages to the executor for execution.

During the computing procedure, the driver needs to consume memory resources. Conventionally, memory resources are often statically allocated to each driver, and once the amount of memory resources needed currently exceeds the amount of memory resources allocated to a driver, the driver may function abnormally.

To reduce the occurrence of the abnormal behavior of the driver, restrictions are often imposed on the data amount of the computing result of a single upload by the executor. Thus, it is expected that the malfunction of the driver caused by the amount of memory resources needed by the data amount of the computing result of the single upload exceeding the amount of memory resources allocated to the driver be prevented.

However, in practical operations, the malfunction of the driver still occurs occasionally.

BRIEF SUMMARY OF THE DISCLOSURE

One aspect of the present disclosure provides a computing apparatus. The computing apparatus includes an executor, a driver, and a proxy component. The executor executes a computing operation based on a driving command to generate an execution result, the driver generates the driving command, and the proxy component is respectively connected to the executor and the driver. Further, the proxy component sends the driving command from the driver to the executor, and sends the execution result from the executor to the driver.

Another aspect of the present disclosure provides an electronic device. The electronic device includes a memory, and one or more processor corresponding to a computing apparatus. The memory includes a plurality of regions. The computing apparatus includes an executor, a driver, and a proxy component. The executor executes a computing operation based on a driving command to generate an execution result, the driver generates the driving command, and the proxy component is respectively connected to the executor and the driver. Further, the proxy component sends the driving command from the driver to the executor, and sends the execution result from the executor to the driver.

Another aspect of the present disclosure provides an information processing method. The method includes: generating, by a driver of the computing apparatus, a driving command, where the computing apparatus further includes a proxy component and an executor, and the proxy component is respectively connected to the executor and the driver. The method further includes: sending, by the driver, the driving command to the proxy component; sending, by the proxy component, the driving command to the executor; in response to the driving command, executing, by the executor, a computing operation to generate an execution result; sending, by the executor, the execution result to the proxy component; and sending, by the proxy component, the execution result to the driver.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Various aspects and features of the present disclosure will be described hereinafter with reference to the accompanying drawings. It should be understood that, various modifications may be made to the disclosed embodiments. Thus, the specification shall not be construed as limiting, but is merely intended to illustrate examples of the embodiments. Other modifications obtainable by those skilled in the relevant art shall all fall within the scope and spirit of the present disclosure.

Figure 1:
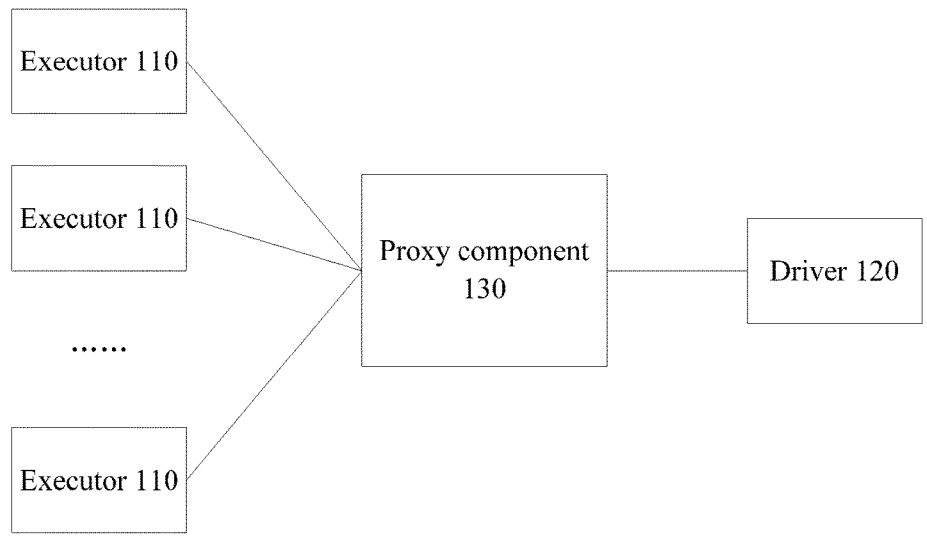
FIG. 1 illustrates a structural schematic view of a computing apparatus consistent with some embodiments of the present disclosure.

The present disclosure provides a computing apparatus. For example, FIG. 1 illustrates a structural schematic view of an example of a type of computing apparatus consistent with some embodiments of the present disclosure. As shown in FIG. 1, the computing apparatus may include a plurality of executors 110, a driver 120, and a proxy component 130. The proxy component 130 may be connected to the plurality of executors 110 and the driver 120, respectively. Optionally, the number of the drivers 120 may not be limited to one, that is, one or more drivers 120 may be included in the computing apparatus. Similarly, the number of the executors included in the computing apparatus may also be one or more.

For example, the plurality of executors 110 may be configured for executing a computing operation based on a driving command, thereby generating an execution result. Optionally, partial executors 110 or each executor 110 may be configured for executing a computing operation based on the driving command to generate an execution result. Further, the driver 120 may be configured for generating a driving command. The proxy component 130 may be configured for sending the driving command generated by the driver 120 to one or more executors 110, or sending the execution result generated by the one or more executors 110 to the driver 120.

In some scenarios, the disclosed computing apparatus may be a computing apparatus applied to a single device, such as a computing apparatus applied to a single server. For example, in a computing apparatus that is applied to a single server, a portion of computing resources of the server may be configured to form one or more executors 110, another portion of the computing resources of the server may be configured to form one or more drivers 120, and another portion of the computing resources of the server may be configured to form one or more proxy components 130.

In some other scenarios, the computing apparatus may be applied to a cluster including a plurality of devices and connections, such as a server cluster including a plurality of servers. For example, in a server cluster including a plurality of servers, a certain number of servers of the server cluster may each be configured to function as an executor 110, and one or more servers of the server cluster may be configured to function as the driver(s) 120, and the server cluster may further include certain devices to function as the proxy component 130. Optionally, the plurality of servers may establish a connection with each other via a local network or a remote network.

As such, according to the present disclosure, the driver 120 may no longer establish a direct connection with an executor 110. That is, a proxy component 130 may be introduced between the executor 110 and the driver 120. One end of the proxy component 130 may be connected to the executor 110, and another end of the proxy component 130 may be connected to the driver 120. Optionally, one end of the proxy component 130 may be connected to one or more executors 110, and another end of the proxy component 130 may be connected to one or more drivers 120.

Further, the driver 120 may be configured for parsing a task, and scheduling the executor(s) 110 to execute the parsed task that includes a plurality of sub-tasks or operations. More specifically, to schedule the executor(s) 110 to execute a task, the driver 120 often generates a driving command, the driving command may be sent to a corresponding executor 110, and after receiving the driving command, the corresponding executor 110 may execute a sub-task or operation under instruction of the driving command. Accordingly, execution of the aforementioned task may be implemented.

When executing certain operations in response to the driving command, an executor 110 may return an execution result to the driver 120. The driver 120 may receive the execution result, store the execution result, and continue to subsequently schedule the task. If the current available memory of the driver 120 is not sufficient, the execution result returned by the executor 110 may not be completely stored, which may result in driving abnormity of the driver 120. If the driver 120 is directly connected to the executor 110, once the driver 120 operates abnormally or is shut down, the executor 110 may fail to establish an effective connection with the driver 120, resulting in the discontinuity of the execution of the task.

By introducing the proxy component 130 in the computing apparatus, if the driver 120 operates abnormally, the driver 120 may be shut down, indicating that the driver 120 is disconnected from the proxy component 130, but the proxy component 130 may stay to be connected with the executors 110. Further, after finding one driver 120 behaves abnormally or is shut down, the proxy component 130 may automatically trigger and start an additional driver 120 or request a processor to start an additional driver 120. When the additional driver 120 is started, the additional driver 120 may establish a connection with the proxy component 130, and the component proxy 130 may update a correspondence relationship between the executors 110 and the driver 120. Further, the proxy component 130 may function as an information-forwarding node between the executors 110 and the driver 120 to forward the driving command and the execution result, thereby facilitating the repair or re-start of the driver 120 for subsequent driving and execution of the task. Thus, the situation that the task cannot be further executed caused by the currently available resources of the driver 120 being insufficient may be reduced, and further, the occurrence of task being lost or low execution success rate may be decreased.

Figure 2:
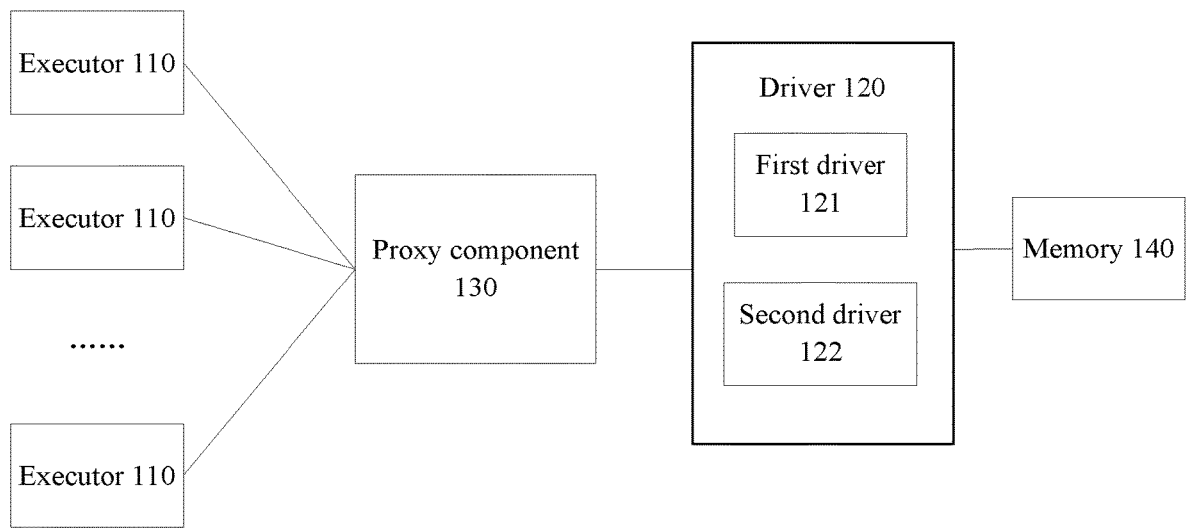
FIG. 2 illustrates a structural schematic view of another computing apparatus consistent with some embodiments of the present disclosure.

In some embodiments, the computing apparatus may further include other components. For example, FIG. 2 illustrates a structural schematic view of another example of a type of computing apparatus consistent with some embodiments of the present disclosure. As shown in FIG. 2, the computing apparatus may include one or more executors 110, a driver 120, a proxy component 130, and a memory 140. The driver 120 may further include a first driver 121 and a second driver 122. The proxy component 130 may be connected between the one or more executors 110 and the driver 120. The memory 140 may be connected to the driver 120. More specifically, the memory may be connected to the first driver 121, and may or may not be connected to the second driver 122.

Functions of the executor 110, the driver 120, and the proxy component 130 may refer to the foregoing descriptions and repeated illustrations are provided herein. The memory 140 may be configured for storing pre-configured information provided by the first driver 121.

Further, the first driver 121 included in the first driver 120 may be configured for determining whether a first amount of the memory resources needed by the currently received execution result exceeds a second amount of memory resources or not, where the second amount of memory resources may refer to the amount of memory resources currently available to the first driver 121. Further, a third amount of memory resources may refer to the amount of memory resources allocated to the second driver 122, and a fourth amount of memory resources may refer to the total amount of memory resources allocated to the first driver 121. Optionally, the fourth amount of memory resources allocated to the first driver 121 may equal to the sum of the first amount and the amount of memory resources needed to store the pre-configured information.

Further, the third amount of memory resources allocated to the second driver 122 is configured to be greater than the fourth amount of memory resources allocated to the first driver 121. The second driver 122 may be configured for, after establishing a connection with the proxy component 130, driving the executor(s) 110 based on the pre-configured information and the execution result. For example, when the first driver 121 operates abnormally or is shut down because of insufficient memory resources allocated thereto, and the second driver 122 with greater memory resources allocated thereto may be triggered to establish a connection with the proxy component 130, such that execution of a task may be continued. The second driver 122 may be started by the first driver 121, the proxy component 130, or other processing components.

Optionally, the memory 140 included in the disclosed computing apparatus may correspond to various storage media. A storage medium may be, for example, a read-only memory (ROM), a random access memory (RAM), or a flash memory, etc. In some embodiments, the storage medium may refer to a memory region other than the memory specifically allocated to the driver 120.

In some embodiments, when the amount of the memory resources needed by the first driver 121 to receive the execution result returned by the executor 110 is greater than the amount of the currently remaining memory resources of the first driver 121 (i.e., the first amount is greater than the second amount), if the first driver 121 continues to receive the execution result from the executor 110, the issue of abnormal subsequent execution result caused by partial execution result being lost may be encountered, or the issue of execution fault of the first driver 121 caused by insufficient memory resources may be encountered. In such situation, the second driver 122 to which a greater amount of the memory resources are allocated may be triggered and started for operation based on the pre-configured information and the execution result.

Further, because of the configuration of the memory 140, the first driver 121 may temporarily store the pre-configured information to the memory 140, where the pre-configured information may be essential information for the driver 121 and/or the driver 122 to drive the executor(s) 110 to execute a task. For example, the pre-configured information may include various types of information generated by the first driver 121 when parsing a task or scheduling a task, and the first driver 121 may store all information related to the scheduling of a current task to the memory 140.

Further, the second driver 122 may receive the execution result from the proxy component 130 directly. Or, after the first driver 121 transfers the pre-configured information to the memory 140, the execution result may be transferred from the proxy component 130 to the memory 140, such that the second driver 122 may read the execution result from the memory 140.

In some embodiments, the proxy component 130 may also be connected to the memory 140, and the proxy component 130 may store the execution result directly to the memory 140 when the amount of the currently available memory resources of the first driver 121 is smaller than the amount of memory resources needed by the execution result. The pre-configured information may be essential information provided by the first driver 121 for instructing the second driver 122 to provide subsequent driving service. For example, a large portion of the information in the memory resources allocated to the first driver 121 may be configured for enabling the second driver 122 to provide subsequent driving service. Such information is also component part of the pre-configured information and needs to be stored in the memory 140.

After the first driver 121 stores the pre-configured information to the memory 140, the second driver 122 may read the pre-configured information from the memory 140, and read the execution result from the proxy component 130 or the memory 140. After reading the pre-configured information and the execution result, the second driver 122 may continue to provide driving service that the first driver 121 provides.

In such situation, the amount of memory resources allocated to the second driver 122 often needs to be greater than the sum of the first amount and the amount of memory resources needed by storing the pre-configured information. That is, the amount of the memory resources allocated to the second driver 122 needs to be greater than the sum of the amount of memory resources needed by the pre-configured information and by the execution result. Because the pre-configured information is various types of information provided by the first driver 121 to drive and execute a task to a certain stage, after the second driver 122 is started and the pre-configured information and the execution result are loaded from the memory 140, subsequent driving may be continued, which ensures that the task will not be lost. Accordingly, the success rate to drive and execute the task may be improved.

As such, when the first driver 121 is shut down, the second driver 122 may be started, and because each executor 110 is connected to the driver 120 (i.e., the first driver and the second driver) via the proxy component 130, the status switching of the driver 120 is transparent for each executor 110. In other words, the switching from the first driver 121 to the second driver 122 is well accepted by the executors 110. Thus, the executors 110 will not encounter the issue of abnormal status caused by change in the status of the driver 120.

Optionally, the number of the drivers included in the driver 120 may not be limited to 2, that is, the driver 120 may include two or more drivers. For example, the driver 120 may include a first driver 121, a second driver 122, and a third driver 123. The amount of the memory resources allocated to the third driver 123 may be greater than the amount of the memory resources allocated to the second driver 122, and the amount of the memory resources allocated to the second driver 122 may be greater than the amount of the memory resources allocated to the first driver 121. In practical implementation, the amount of the memory resources allocated to the third driver 123 may be approximately twice of the amount of the memory resources allocated to the second driver 122, and the amount of the memory resources allocated to the second driver 122 may be approximately twice of the amount of the memory resources allocated to the first driver 121.

Thus, when the amount of memory resources allocated to the second driver 122 is still smaller than the sum of the amount of memory resource needed by the execution result and the amount of memory resources needed by the pre-configured information, the third driver 123 to which an even greater amount of memory memories are allocated may be triggered and started to ensure that the task can be continued without interruption.

Further, the memory 140 may be a common memory including a common storage region, and the memory 140 may be shared by each driver included in the driver 120. For example, the memory 140 may be connected to a bus A, and each driver included in the driver 120 may also be connected to the bus A. Thus, when any driver included in the driver 120 functions abnormally, such driver may utilize the memory 140 to perform temporary storage of the pre-configured information.

When the memory 140 is a common memory, the computing apparatus may further include a memory management component. The memory management component may be provided for monitoring the storage status of the memory 140, and based on the current storage status of the memory 140, allocating temporary memory regions for different drivers included in the driver 120. The memory management component may be further provided for recording storage locations of the pre-configured information sent by different drivers. Further, when a driver that replaces a driver that functions abnormally is started, the memory management component may be configured for assisting the newly started driver in identifying the location of the pre-configured information provided by the driver that functions abnormally, and further returning the corresponding pre-configured information to the newly started driver.

By configuring the memory 140 in the present disclosure to be a common memory, the effective utilization rate of the common storage region may be increased, such that more memory resources within the computing apparatus may be saved for use by operation or service. Accordingly, the hardware input of the memory resources needed by the computing apparatus may be reduced.

In some other embodiments, after starting a driver included in the driver 120 (e.g., the first driver 121), the computing apparatus may allocate an exclusive storage region for the driver. Such storage region may be a storage resource of the memory 140, and the memory 140 may thus be called an exclusive memory 140. Thus, when the first driver 121 becomes abnormal or the current amount of the memory resources is insufficient to store the execution result, the first driver 121 may send the pre-configured information to the exclusive memory 140.

Further, the second driver 122 may be started to replace the first driver 121, and the second driver 122 may read the pre-configured information stored by the first driver 121 in the exclusive memory 140 to continue providing the driving service. More specifically, after the second driver 122 is started, the second driver 122 may be connected to the exclusive memory 140 in which the first driver 121 stores the pre-configured information. The second driver 122 may further record an identifier of the exclusive memory 140 in the memory resources allocated to the second driver 122, such that the exclusive memory 140 corresponding to the first driver 121 is converted to the exclusive memory 140 corresponding to the second driver 122.

In some embodiments, the first driver 121 and the second driver 122 may be started at approximately the same time. For example, the first driver 121 and the second driver 122 may be started at approximately the same time and may be backup drivers to each other. When in operation, the first driver 121 may encounter a situation in which the first amount of the memory resources needed by the execution result is greater than the second amount, and to reduce the response delay in driving and execution of the task, the already started second driver 122 may timely replace the first driver 121 to provide further driving. If the second driver 122 is to be started approximately the same time as the first driver 121 and is a backup driver of the first driver 121, when the second driver 122 is started, the amount of the memory resources allocated to the second driver 122 needs to be greater than the amount of the memory resources of the first driver 121.

In some other embodiments, the first driver 121 may be a driver started at an $m^{th}$ time, and the second driver 122 may be a driver started at a $(m+1)^{th}$ time, where m is a positive integer. That is, the first driver 121 and the second driver 122 may be started in a sequence or a certain order.

For example, the first driver 121 may be started prior to the second driver 122. When the first driver 121 encounters the issue that the amount of the current memory resources is insufficient, the second driver 122 may be started, and the third amount of memory resources allocated to the second driver 122 may need to be at least greater than the sum of memory resources needed by the pre-configured information and the execution result. Further, the disclosed first driver 121 and the second driver 122 may be drivers started based on the same driving codes.

As described previously, the third amount of memory resources may refer to the amount of memory resources allocated to the second driver 122, and the fourth amount of memory resources may refer to the total amount of memory resources allocated to the first driver 121. Further, the third amount may be N times the fourth amount, where N is an integer greater than or equal to 2. For example, when the total amount of memory resources allocated to the first driver 121 is P.G, the third amount allocated to the second driver 122 may be equal to N* P.G.

In some embodiments, the second driver 122 may be started for multiple times, and the third amount of memory resources allocated to the second driver 122 may display a positive correlation relationship with M, where M is the sequence number that the second driver 122 is started. That is, at the $M^{th}$ time the second driver 122 is started, the amount of the memory resources allocated to the second driver 122 may be M*S, where S may be the minimum amount of memory resources allocated to a driver or a step length of memory resource allocation to re-start the driver. For example, at the $3^{rd}$ time the second driver 122 is started, and the amount of the memory resources allocated to the second driver may be 3*S. Optionally, the positive correlation relationship displayed by the third amount with M may be a directly proportional relationship, or other positive correlation relationships, such as an exponential relationship.

The present disclosure further provides an electronic device, including a computing apparatus described in any of the aforementioned technical solutions. The electronic device may include a storage medium and a processor. Optionally, the number of processors may not be limited to one, that is, the electronic device may include a plurality of processors. Further, each of the plurality of processors may be a multi-core processor.

The storage medium may be divided into a plurality of regions, and the one or more processors may correspond to the executor(s) 110, the driver 120, and the proxy component 130. When responding to a task request, such electronic device may show a relatively low loss rate of the task request and a high success rate of the task request response.

Further, the disclosed electronic device may be an electronic device selected from various types of electronic devices, including personal computers, various types of network servers operating on a network side, or various types of server clusters, etc.

Figure 3:
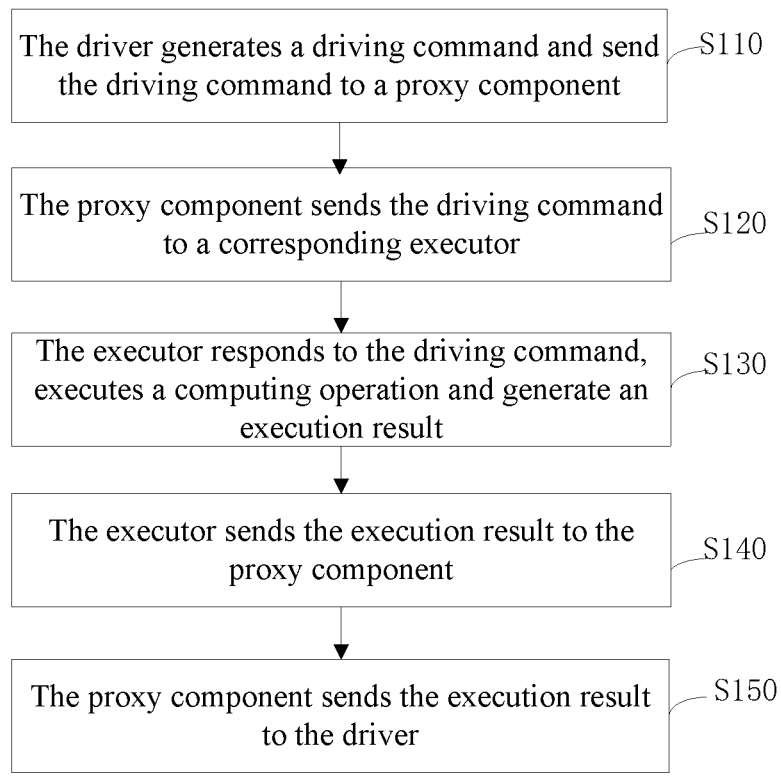
FIG. 3 illustrates a flow chart showing an information processing method consistent with some embodiments of the present disclosure.

The present disclosure further provides an information processing method. The method may be applied to the disclosed computing apparatus or an electronic device including the disclosed computing apparatus. For example, FIG. 3 illustrates a flow chart of an example of a type of information processing method consistent with some embodiments of the present disclosure. As shown in FIG. 3, the disclosed information processing method may include:

S110: generating, by a driver, a driving command, and sending, by the driver, the driving command to a proxy component;

S120: sending, by the proxy component, the driving command to a corresponding executor;

S130: responding, by the executor, to the driving command to execute a computing operation and to generate an execution result;

S140: sending, by the executor, the execution result to the proxy component; and S150: sending, by the proxy component, the execution result to the driver.

More specifically, the driver may, based on a corresponding task request, generate a driving command, and send the driving command to the proxy component. After receiving the driving command, the proxy component may send the driving command to a corresponding executor. In some embodiments, the proxy component may pre-store a correspondence relationship between each driver and the executor, such that the proxy component may send the driving command generated by a driver to a corresponding executor based on the pre-stored correspondence relationship between drivers and executors.

In some other embodiments, the driver may notify the proxy component the specific executor that the current driving command is sent to, and after the proxy component receives the driving command, the proxy component may determine the executor to receive the driving command based on the driving command or other information sent by the driver. Further, the proxy component may send the driving command to the corresponding executor.

Further, in S130, after the executor receives the driving command, the executor may start to execute a task and generate a corresponding execution result. Further, through S140 and S150, the executor eventually returns the execution result to the driver. When returning the execution result, the executor may first send the execution result to the proxy component, and after the proxy component receives the execution result, if a plurality of drivers exists, the proxy component may, based on the pre-stored correspondence relationship or the sending record of the driving command, determine the specific driver to which the execution result is sent. Further, the proxy component may send the execution result to the corresponding driver. If the current computing apparatus includes only one driver in the working state, the proxy component may directly send the execution result to the driver.

In some embodiments, after the proxy component receives the execution result, the proxy component may drive the amount of the memory resources needed by storing the execution result (i.e., the first amount) and notify the corresponding driver. After receiving the notification information of the first amount, the corresponding driver may, based on usage status of the memory resources, determine the amount of the memory resources currently available (i.e., the second amount). Once the first amount is greater than the second amount, the driver may transfer its information (e.g., identification information of the driver) to a memory, and further send pre-configured information provided for the driver and/or other drivers to drive the one or more executors to execute a task and the execution result received from the proxy component to the memory.

Optionally, a second driver may be started and, after establishing a connection with the proxy component, drive a second executor based on the pre-configured information and the execution result. When the second executor establishes a connection with the proxy component, the second driver may read execution result generated by the second executor from the proxy component.

In some embodiments, according to the aforementioned descriptions, the memory 140 may also be connected to the proxy component 130 directly, and when the first amount is determined by the first driver 121 to be greater than the second amount, the proxy component 130 may directly send the execution result to the memory 140. Optionally, the first driver 121 may also send the execution result and other information needed by the first driver 121 and the second driver 122 for subsequent driving to the memory 140 to be stored. Thus, the execution body that stores the execution result to the memory 140 may not be limited to the first driver 121, but may also be the proxy component 130.

Figure 4:
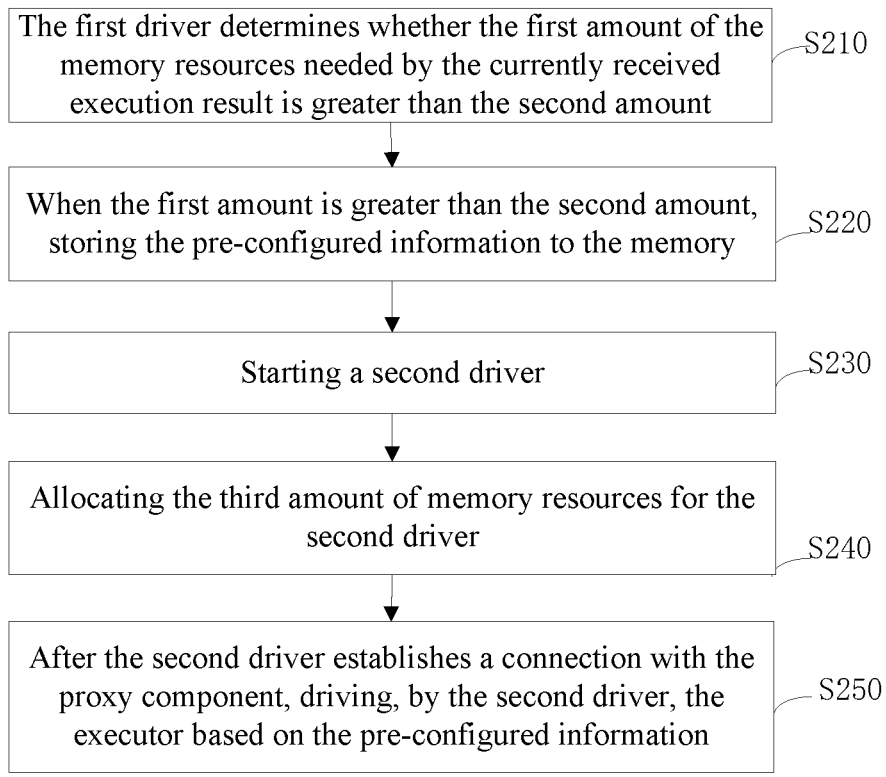
FIG. 4 illustrates a flow chart showing another information processing method consistent with some embodiments of the present disclosure.

In some embodiments, FIG. 4 illustrates a flow chart of another example of a type of information processing method consistent with some embodiments of the present disclosure. As shown in FIG. 4, the method may further include:

S210: determining, by a first driver, whether the first amount of the memory resources needed by the currently received execution result is greater than a second amount, where the second amount refers to the amount of currently available memory resources to the first driver;

S220: when the first amount is greater than the second amount, storing the pre-configured information to the memory;

S230: starting a second driver;

S240: allocating a third amount of memory resources to the second driver, where the third amount is greater than a fourth amount and the fourth amount is the total amount of memory resources allocated to the first driver; optionally, the fourth amount may be the sum of first amount and the amount of memory resources needed to store the pre-configured information; and S250: when the second driver establishes a connection with the proxy component, driving, by the second driver, the executor based on the pre-configured information and the execution result.

When the first amount is greater than the second amount, the first driver may be shut down, and the pre-configured information and the execution result may be stored in the memory. Further, the second driver that replaces the first driver is started. The amount of the memory resources allocated to the second driver may be configured to be at least greater than the first amount. Or, the amount of the memory resources allocated to the second driver may be greater than the total amount of the memory resources allocated to the first driver.

After the second driver establishes a connection with the proxy component, the second driver may provide subsequent driving service to drive the executor based on the pre-configured information and the execution result. Thus, the phenomenon that the task cannot be further driven and executed caused by the first amount being greater than the second amount may be reduced, and the execution success rate of the task may be improved.

Further, the execution result may be read from the proxy component and stored in the memory after the first driver transfers the information stored therein to the memory to be stored. After the second driver is started, the second driver may read the pre-configured information and the execution result together from the memory. In some other embodiments, the second driver may read the pre-configured information from the memory. After establishing a connection with the proxy component, the second driver may further read the execution result from the proxy component, and based on the pre-configured information and the execution result, the second driver may continue to provide the driving service.

In some embodiments, the method may further include:
reading, by the second driver, the pre-configured information from the memory; and
based on the pre-configured information, performing, by the second driver, a configuration.

Further, performing, by the second driver, the configuration may include: based on parameters such as information content of the pre-configured information or the data amount of the pre-configured information, configuring the operation parameters of the second driver, and configuring parameters of scheduling and allocation of a corresponding task.

In some embodiment, the first driver may be a driver started at an mth time, and the second driver may be a driver started at a $(m+1)^{th}$ time where m is a positive integer. Further, the first or second driver may be a processor or a processing circuit, and the processor or the processing circuit may be formed by preset driving codes. The driver started at the mth time may be referred to as the mth driver, and the driver started at the $(m+1)^{th}$ time may be referred to as the $(m+1)^{th}$ driver. The mth driver and the $(m+1)^{th}$ driver may be formed based on the same section of the driving codes.

In some embodiments, allocating a third amount of memory resources to the second driver (S240) may include: allocating the third amount of memory resources that is approximately N times the fourth amount of memory resources to the second driver, where N is an integer greater than or equal to 2, and the fourth amount is the total amount of memory resources allocated to the first driver.

That is, the total amount of memory resources allocated to the second driver started after the first driver may be N times of the memory resources allocated to the first driver. The increase in the memory resources allocated to the second driver started by the same section of driving codes that form the first driver may help reduce the occurrence of the phenomenon that the amount of the memory resources currently available to the subsequently started driver (e.g., the second driver) still cannot satisfy the demand of storing the execution result.

Optionally, allocating a third amount of memory resources to the second driver (S240) may include: based on the number of times that the same section of driving codes is started (denoted by "m+1"), determining the third amount, where the third amount is positively correlated to "m+1". The positive correlated relationship herein may refer to the directly proportional relationship or an exponential relationship, etc.

With reference to the aforementioned descriptions, some examples of the information processing method are provided hereinafter. In one example, the present disclosure provides an information processing method, comprising: instead of being directly connected to a driver 1, an executor is connected to the driver 1 via a proxy component; and when the memory configuration of the driver 1 does not satisfy the actual demand, the driver 1 performs a local persistence operation on all essential information (i.e., pre-configured information). For example, the driver 1 may store all essential information in a local non-transitory storage medium.

The information processing method may further include: stopping, by the driver 1, the driving service, for example, the driver 1 may be shut down; and starting a driver 2 to which twice of the memory configuration of the driver 1 is allocated. For example, if the amount of memory resources configured for the driver 1 that is started at the first place is 1G, the amount of memory resources configured for the driver 2 that is started at the second place may be 2G, and the amount of memory resources configured for the driver 3 that is started at the third time may be 4G.

The information processing method may further include: loading, by the driver 2, the local persistence data to ensure consistency with the information used by the driver 1, establishing, by the driver 2, a connection with the proxy component to acquire an execution result from the proxy component returned by the executor, and based on the local persistence data and the execution result, continuing the driving service provided by the driver 1.

Figure 5:
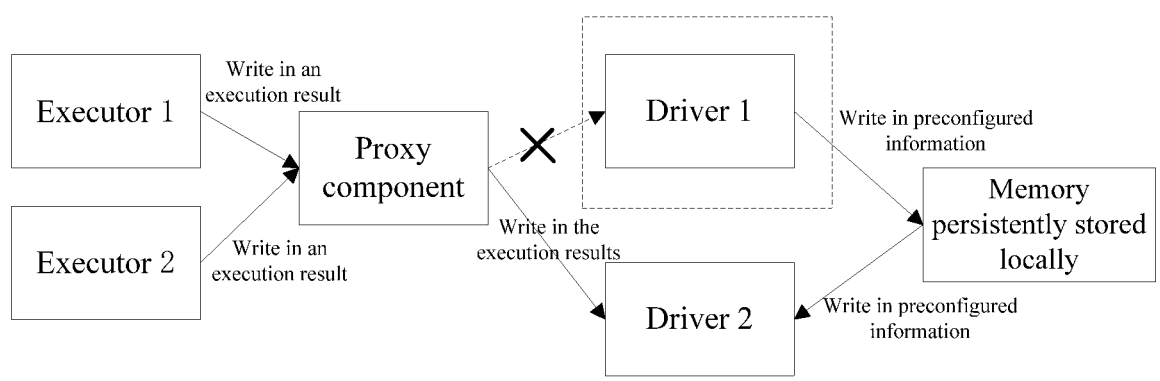
FIG. 5 illustrates a flow chart showing another information processing method consistent with some embodiments of the present disclosure.

In another example, FIG. 5 illustrates a flow chart of another information processing method consistent with some embodiments of the present disclosure. As shown in FIG. 5, the disclosed information processing method comprises: using an executor 1 and an executor 2 to respectively write in an execution result in a proxy component; and writing in, by the driver 1, pre-configured information to a local persistence memory, where the pre-configured information may include all essential information needed by the driver 1 to provide the driving service. When the amount of the memory resources currently available to the driver 1 is insufficient to store the execution results, the driver 2 may be started. The total amount of memory resources allocated to the driver 2 may be greater than the total amount of memory resources allocated to the driver 1, and the total amount of memory resources allocated to the driver 2 may be greater than the first amount needed by the execution result.

Further, the proxy component may disconnect the connection with the driver 1 and write in the execution results to the driver 2. The local persistence memory may write in the pre-configured information stored by the driver 1 to the driver 2. The driver 2 may continue to provide driving service based on the pre-configured information and the execution results.

In examples provided by the present disclosure, it should be understood that, the disclosed devices and methods may be implemented through other manners. Various embodiments in the specification are described in a progressive manner, and each embodiment highlights their difference from other embodiments, and the same or similar parts between each embodiment may refer to each other.

In various embodiments of the present disclosure, it should be understood that the disclosed method, device and apparatus may be implemented by other manners. In other words, the devices described above are merely for illustrative purposes. For example, the units may be merely partitioned by logic function. In practice, other partition manners may also be possible. For example, various units or components may be combined or integrated into another system, or some features may be omitted or left unexecuted. Further, mutual coupling or direct coupling or communication connection displayed or discussed therebetween may be via indirect coupling or communication connection of some communication ports, devices, or units, in electrical, mechanical or other manners.

Units described as separated components may or may not be physically separated, and the components serving as display units may or may not be physical units. That is, the components may be located at one position or may be distributed over various network units. Optionally, some or all of the units may be selected to realize the purpose of solutions of embodiments herein according to practical needs. Further, each functional unit in each embodiment of the present disclosure may be integrated in one processing unit, or each unit may exist physically and individually, or two or more units may be integrated in one unit.

When the described functions are implemented as software function units, and are sold or used as independent products, they may be stored in a computer accessible storage medium. Based on such understanding, the technical solutions of the present disclosure, or the portions contributing to the prior art may be embodied in the form of a software product. The computer software product may be stored in a storage medium, and include several instructions to instruct a computer device (e.g., a personal computer, a server, or a network device) to execute all or some of the method steps of each embodiment. The storage medium described above may include portable storage device, ROM, RAM, a magnetic disc, an optical disc or any other media that may store program codes.

The foregoing is only specific implementation methods of the present disclosure, and the protection scope of the present disclosure is not limited thereto. Without departing from the technical scope of the present disclosure, variations or replacements obtainable by anyone skilled in the relevant art shall all fall within the protection scope of the present disclosure. The protection scope of the subject disclosure is therefore to be limited only by the scope of the appended claims.

What is claimed is:

1. A computing apparatus, comprising one or more processors and a memory, the one or more processors configured to execute instructions to construct:
   an executor configured to execute a computing operation based on a driving command to generate an execution result;
   a first driver configured to generate the driving command; and
   a proxy component respectively connected to the executor and the first driver, the proxy component being configured to send the driving command from the first driver to the executor, and also to send the execution result from the executor to the first driver,
   wherein, the one or more processors are further configured to:
      determine whether an amount of memory resources needed by a currently received execution result exceeds an amount of memory resources currently available to the first driver;
      in response to the amount of memory resources needed by the currently received execution result exceeding the amount of memory resources currently available to the first driver, start a second driver and transfer pre-configured information from the first driver to the memory, the pre-configured information including information related to a schedule of a current task, the second driver being configured to drive the executor based on the pre-configured information and receive the currently received execution result after establishing a connection with the proxy component; and
      in response to the second driver being started, allocate memory resources to the second driver, an amount of the memory resources allocated to the second driver being greater than a sum of the amount of memory resources needed by the currently received execution result and an amount of memory resources needed to store the pre-configured information;
   wherein the amount of memory resources allocated to the second driver is N times the sum of the amount of memory resources needed by the currently received execution result and an amount of memory resources needed to store the pre-configured information, N being an integer greater than or equal to 2.

2. The computing apparatus according to claim 1, wherein:
   the first driver is a driver started at an $m^{th}$ time, and
   the second driver is a driver started at a$(m+1)^{th}$ time, m is a positive integer.

3. The computing apparatus according to claim 1, further comprising:
   a memory management component,
   wherein the memory management component monitors a storage status of the memory, allocates the memory resources to the first and second drivers based on the storage status of the memory, and records a location of the pre-configured information in the memory.

4. An electronic device, comprising:
   a memory, including a plurality of regions; and
   one or more processors, corresponding to a computing apparatus, wherein the computing apparatus comprises:
      an executor configured to execute a computing operation based on a driving command to generate an execution result; a first driver configured to generate the driving command; and
      a proxy component respectively connected to the executor and the first driver, wherein the proxy component is configured to send the driving command from the first driver to the executor, and also to send the execution result from the executor to the first driver,
   wherein the computing apparatus is configured to:
      determine whether an amount of memory resources needed by a currently received execution result exceeds an amount of memory resources currently available to the first driver;
      in response to the amount of memory resources needed by the currently received execution result exceeding the amount of memory resources currently available to the first driver, start a second driver and transfer pre-configured information from the first driver to the memory, the pre-configured information including information related to a schedule of a current task, the second driver being configured to drive the executor based on the pre-configured information and receive the currently received execution result after establishing a connection with the proxy component; and
      in response to the second driver being started, allocate memory resources to the second driver, an amount of the memory resources allocated to the second driver being greater than a sum of the amount of memory resources needed by the currently received execution result and an amount of memory resources needed to store the pre-configured information;
   wherein the amount of memory resources allocated to the second driver is N times the sum of the amount of memory resources needed by the currently received execution result and an amount of memory resources needed to store the pre-configured information, N being an integer greater than or equal to 2.

5. The electronic device according to claim 4, wherein:
   the first driver and the second driver are started based on same programming codes executable by the one or more processors.

6. The electronic device according to claim 4, wherein:
   at least one of the one or more processors is a multi-core processor.

7. An information processing method, comprising:

generating, by a first driver of a computing apparatus, a driving command, wherein the computing apparatus further includes a proxy component and an executor, and the proxy component is respectively connected to the executor and the first driver;

sending, by first the driver, the driving command to the proxy component; sending, by the proxy component, the driving command to the executor;

in response to the driving command, executing, by the executor, a computing operation to generate an execution result; sending, by the executor, the execution result to the proxy component; determining whether an amount of memory resources needed by a currently received execution result exceeds an amount of memory resources currently available to the first driver;

in response to the amount of memory resources needed by the currently received execution result not exceeding the amount of memory resources currently available to the first driver, sending, by the proxy component, the execution result to the first driver;

in response to the amount of memory resources needed by the currently received execution result exceeding the amount of memory resources currently available to the first driver, starting a second driver and transfer pre-configured information from the first driver to the memory, the pre-configured information including information related to a schedule of a current task, the second driver being configured to drive the executor based on the pre-configured information and receive the currently received execution result after establishing a connection with the proxy component; and in response to the second driver being started, allocating memory resources to the second driver, an amount of the memory resources allocated to the second driver being greater than a sum of the amount of memory resources needed by the currently received execution result and an amount of memory resources needed to store the pre-configured information;

wherein the amount of memory resources allocated to the second driver is N times the sum of the amount of memory resources needed by the currently received execution result and an amount of memory resources needed to store the pre-configured information, N being an integer greater than or equal to 2.

8. The method according to claim 7, further comprising:

reading, by the second driver, the pre-configured information from the memory; and based on the pre-configured information, performing, by the second driver, a configuration.

9. The method according to claim 8, wherein:

based on the pre-configured information, performing, by the second driver, a configuration includes:

based on content and a data amount of the pre-configured information, configuring operation parameters of the second driver to drive a task.

10. The method according to claim 7, wherein:

the first driver is a driver started at an $m^{th}$ time, and the second driver is a driver started at a $(m+1)^{th}$ time, m is a positive integer.

* * * * *